Figure 1:
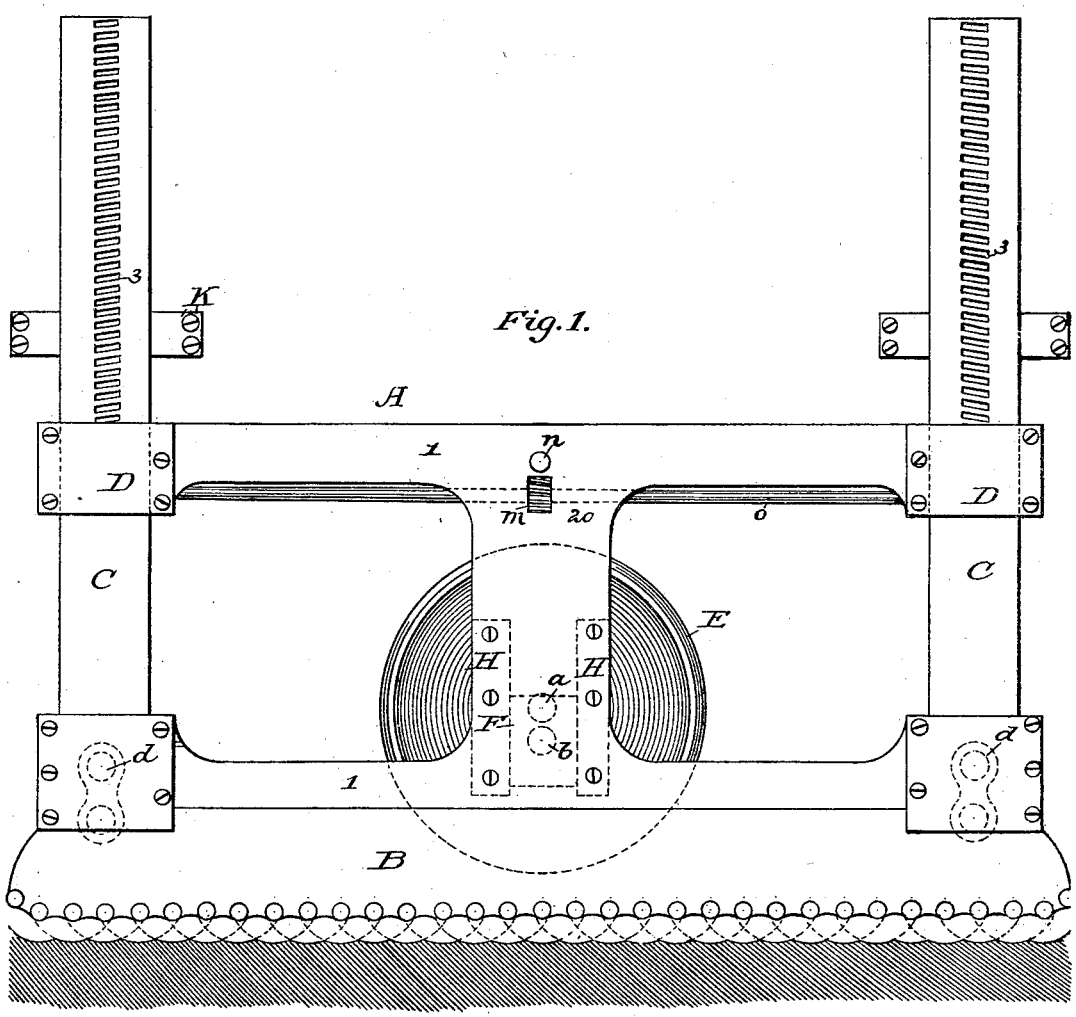

(No Model.) 2 Sheets—Sheet 1.

A. G. WEBSTER & C. M. WILLARD.
STONE CHANNELING MACHINE.

No. 245,899. Patented Aug. 16, 1881.

Attest:
R. H. Barnes
S. W. Luly

Inventors
Albert G. Webster
Cyrenius M. Willard
by Ellis Spear
Atty (No Model.) 2 Sheets—Sheet 2.
A. G. WEBSTER & C. M. WILLARD.
STONE CHANNELING MACHINE.
No. 245,899. Patented Aug. 16, 1881.
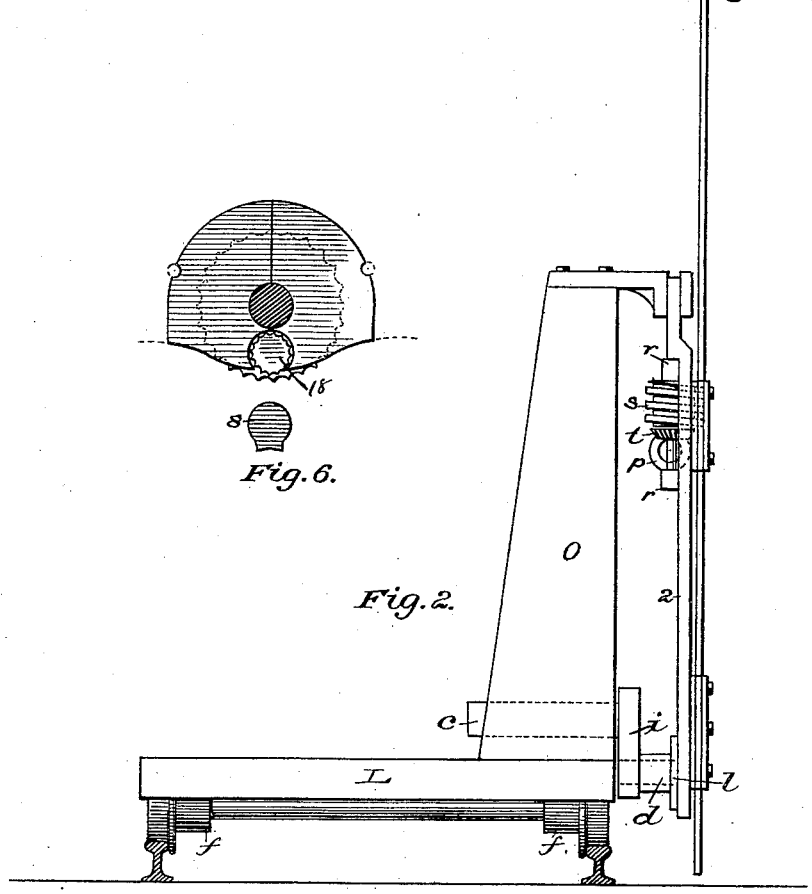
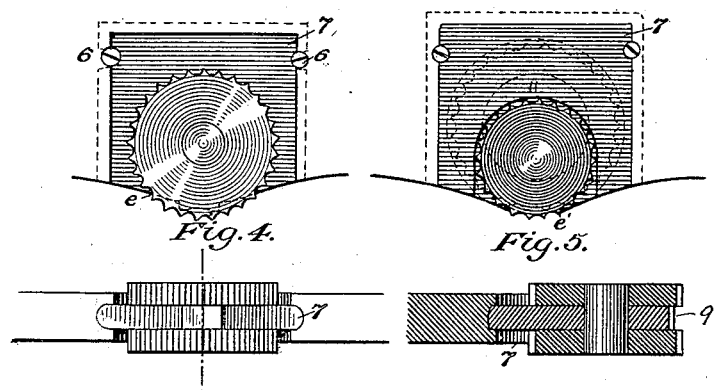
Attest:
R. F. Barnes
S. W. Luly
Inventor:
Albert G. Webster
Cyrenius M. Willard
by Ellis Spear
Atty

UNITED STATES PATENT OFFICE.

ALBERT G. WEBSTER, OF RUTLAND, AND CYRENIUS M. WILLARD, OF PITTSFORD, VERMONT; SAID WEBSTER ASSIGNOR TO SAID WILLARD.

STONE-CHANNELING MACHINE.

SPECIFICATION forming part of Letters Patent No. 245,899, dated August 16, 1881.

Application filed May 11, 1881. (No model.)

*To all whom it may concern:*

Be it known that we, ALBERT G. WEBSTER, of Rutland, and CYRENIUS METCALF WILLARD, of Pittsford, both in the county of Rutland and State of Vermont, have jointly invented a new and useful Improvement in Stone-Channeling Machines; and we do hereby declare that the following is a full, clear, and exact description of the same.

Our invention relates to machines for channeling stone, and is primarily an improvement upon the machine shown in Letters Patent granted Cyrenius M. Willard (one of the parties hereto) on the 16th day of March, 1875, and numbered 160,888; but some parts of said improvements are applicable to machines differing materially in construction from that shown in said patent.

The invention consists, first, in the combination, with a machine for channeling stone, of a series of toothed wheels loosely mounted in a blade or bar and in the same or parallel plane with said blade or bar, and provided with means for imparting to said series of wheels as mounted either a direct reciprocating motion to the stone or bottom of the channel in the stone, or a reciprocating and circular motion, whereby each tooth-point is made to move in an independent circle or in the arc of a circle or some equivalent of a circle, as will be hereinafter more fully explained.

Our invention, in the second place, consists of a bar or blade provided with toothed cutting-wheels adapted to cut a clearing path for the bar or blade, in combination with two or more cranks adapted to impart a circular and oscillating movement to said bar, whereby each tooth-point is made to move in a circle or to oscillate in the arc of a circle, or have equivalent movement, said movement being so adjusted in relation to the distance between the cutting-wheels that they shall each intersect the circuit of adjacent wheels, and thereby cut a continuous channel.

Our invention consists, third, in setting a toothed wheel in the end of the bar or blade, whereby the said bar or blade may be fed down into the ledge or solid bed, and thereby clear the channel at the ends as well as at the bottom.

Our invention consists, fourth, in securing said toothed wheels to a bar, saw, or blade by means of a box or case, whereby they may be easily secured and removed.

Our invention consists, fifth, in setting the toothed wheels in pairs with a cutting point or cleaner between them, or, instead, of a point with an interposed wheel for removing from the channel any strip or spurs uncut by the wheels.

It is proposed with our improved machine to cut a channel or channels into the bed-rock from the surface downward to any desired depth, and to have the cutting apparatus self-clearing from any binding in the curve or channel, and that when the channel has been cut by the machine in one position to advance the machine and repeat the process.

The especial means shown which we deem best adapted for carrying our invention into effect are represented in the accompanying drawings, in which—

Figure 7:
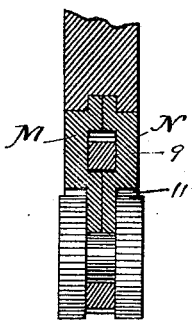

Figure 1 is a side elevation of the cutting-bar and of the devices which directly support and impart motion to it. Fig. 2 is an end elevation of the machine, representing it as in place upon the track upon which it is designed to move. Fig. 3 represents the toothed wheels as arranged in the bar, with the boxes for retaining them in place. Fig. 4 represents the face of a part of the cutting-bar with one pair of toothed wheels and with projections between the said wheels, for clearage. Fig. 5 is a sectional view of Fig. 4. Figs. 6 and 7 represent details.

In the drawings, a platform, L, is mounted upon the wheels $f\,f$, which run upon rails in the manner of ordinary stone-channeling machines. Also, upon the platform are mounted the posts O of the frame-work, upon one or both sides, for supporting the cutting apparatus and their operating parts. The engine for driving the machine and for moving the carriage from place to place is to be mounted also upon the platform. In suitable boxes upon the side of the platform L are mounted rock-shafts $c\,c$, having cranks $i$ and crank-pins $d$. These crank-pins project into boxes $l$ fixed to the frame A, near the bottom, and thereby support said frame and permit it to have longitudinal and vertical motion to a limited extent, as hereinafter fully described.

The frame A is composed of two principal transverse bars, 1 1, and three vertical bars, 2 2 and 20. The vertical bars 2 2 extend through guide-slots in brackets K at their upper ends, which brackets support the frame in a vertical position.

The cutter-bar B is fixed to bars C C, which move vertically in boxes or guides D on the main frame A, so that the cutter-bar may be raised or lowered in relation to the frame, but maintains a fixed relation to it in other respects.

As heretofore explained, the frame A has a free oscillating movement from front to rear upon the cranks $i$. Oscillating motion is imparted to it by means of a crank and balance-wheel, E, fixed to the engine-shaft $a$. The wheel E has a crank-pin, $b$, which projects outwardly into a slide-bar, F, which plays between bars H H, attached firmly to the inner face of the carrying-frame A. As the box F slides freely up and down in the guides, it will be apparent that the revolution of the wheel E will give an oscillating movement to the frame and to the bar B carried thereon, which movement, as the frame is mounted upon the crank-pins $d$, will be such that any given point upon the lower edge of the cutting-bar will describe in its movement an arc of a circle, as represented in dotted lines in Fig. 1. It will be obvious that other devices may be readily provided for imparting this movement to the frame, or an equivalent of this movement, which is designed to cause the cutting-points on the bar to rise and fall—or, in other words, recede from and approach to the rock which is to be cut, and in rising and falling to have also a slight back-and-forth movement, so as to cut or pick the rock; but this movement performs an especial and peculiar function in connection with the toothed wheels, as hereinafter more fully described. The cutting-points are preferably formed upon these wheels, hereinafter described; but the movement above described is applicable to points fixed upon the bar or to points carried upon revolving wheels set in the edge of the bar.

It will be observed by reference to Fig. 1 that the crank-pin $b$ upon the wheel E is set at such a distance from the center as to give arcs of motion of the cutting-points, as represented in the dotted lines. These arcs, or rather the chords of these arcs, are approximately twice the length of the distance between the wheels or cutting-points, so that each wheel or tooth in some part of its movement comes into the path made by the wheel or tooth next in order in another part of the movement of the bar, thereby cutting a clear channel.

It will be understood that as the cutting-points operate it is necessary that they should be constantly fed inward into the channel. This is accomplished by means of worms gearing into racks 3 3 on the bars C.

Impelling mechanism consists of a worm-shaft, $n$, which may be moved by ratchet-wheel suitably connected to the engine, which worm turns a worm-wheel, $m$, on the feed-shaft $o$. This feed-shaft, at each end, carries a beveled gear, $p$, working into another beveled gear, $t$, attached to the worm $s$, causing it to revolve on its shaft in boxes $r\ r$ on the frame A. The worm gearing into the rack, as aforesaid, moves these bars C C with a steady vertical motion, feeding them downward at any desired speed, which may be regulated by well-known adjustments either in the ratchet or elsewhere.

We have described the movement to be imparted to the cutting-bar, whether that bar were provided with fixed teeth or with toothed wheels. The advantages resulting from the oscillating movement over those of the rotary movement of the cutting-points, as shown in the patent heretofore mentioned, are gained both with the fixed points shown in that patent and with the tooth-wheels herein shown. The points on the wheels in the oscillating movement cut in both directions, while in the rotary movement shown in the patent specified the teeth or cutting-points in the upper part of the revolution of the crank-pin are lifted altogether out of contact with the stone, and then move without effect. But special advantages are gained by the toothed wheels in connection either with the rotary or oscillating movement of the shafts which carry the cutting-bar. These wheels are represented at $e$ and $e'$ more plainly in Fig. 3. They are made of steel or chilled iron, and are firmly connected to an axle which turns freely in a box set in the bar B. They are so set as to have their outer surfaces in a plane outside the lateral faces of the bar, so as to cut a kerf wider than the thickness of the said bar, to prevent binding. What are technically called "boxes" (shown at 7, Figs. 3, 4, and 5) are steel plates made thick enough to afford firm bearing for the axis of the wheels and set in slots in the bar B, or between plates composing the bar. They are held in place preferably by rivets 6 6. This construction facilitates the insertion and removal of the wheels, it being necessary for such purpose only to manipulate the rivets 6 6. The axis of each pair of wheels is let into the bar by means of a slot opening to the exposed face, which slot, after the axis has been inserted, may be filled by a tooth, 8, Fig. 6, driven in and left projecting far enough to form a clearer to cut away the ridge left between the path of the wheels; or the form of box shown in Fig. 6 may be used divided transversely in a line through the axis or bearing. In this case a recess may be left for the tooth 8 or for the small cutting-wheel 18. Instead of this tooth, we may use a second wheel, 9, as shown in Figs. 3 and 7. This necessitates a slight change in the construction of the box, and for this we make the box preferably of the same thickness as the bar B and insert and hold it as removable saw-teeth are commonly inserted and held. The box is made in two parts, (shown in section at M and N, Fig. 7, and in side elevation in dotted lines in Fig. 3, right-hand part.) The parts are formed with a circular groove for the central toothed wheel, 9, the grooved part being cut away to expose the edge of the wheel on the working side. This wheel turns on the central boss, 11, in the edge of which is a bearing for the axis of the wheels $e$ $e'$. These are first put in place, and the annular wheel 9 is then fitted in place, and the two sides, placed together, hold it in position. Of course a solid box may be used, one wheel being fixed on the axis after the latter is inserted in the box. The action of the teeth of these wheels against the rock is well understood by those skilled in the art. The wheels, as before stated, turning freely, may present any of the points to the work.

In connection with the rotary or oscillating movements heretofore described or referred to in the previous patent, the effect of the wheels is augmented. The relative paths of the wheels and the situations of said wheels on the cutter-bar are shown at the bottom of Fig. 1. The bar is preferably curved upward between the wheels to give them free action. The motion of the wheels caused by the revolution of the shaft $a$ and pin $b$ acting upon the frame A is from the position of one wheel to a point distant twice the space between two adjacent wheels. This exact distance need not be maintained; but any other which causes the wheels to cut into the arcs or curves of those next to them will form a complete channel. As each toothed wheel moves through its own arc and, approaching, strikes the stone it is turned slightly, bringing the next tooth into action, and so on in its passage through the arc. This motion of the wheels, therefore, as they are carried on the oscillating bar, causes the wheels to turn and several of the teeth to act in succession as small chisels, each point cutting as if it were a separate chisel driven by a blow in the direct line of its cut, but with all the power applied to the shaft $a$ and the momentum of the whole frame. This action of the toothed wheels in the respect just described would be the same if the points had circular motion; but more rapid work, as described heretofore, is done by the oscillation without loss of momentum. The wheel $e$ continues its rotation, but simply rocks or oscillates the cutter-bar. The wheels cut in both directions. When the bars have reached proper depth the feed-ratchet may be reversed and the bar raised. The whole carriage is then moved forward in the usual way.

The described means for oscillating the bar and giving to each point motion through the arc of a circle are the best known to me; but other means may be easily provided and other curves than an exact arc of a circle may be described by the tools without departing from the spirit of my invention.

The wheel set in the end of the bar is represented at 13 in Fig. 1. It is set at the angle or corner, so as to cut quite to the end of the bar and permit it to be fed down into the ledge or solid bed, and clears the channel at the ends as well as bottom of the cut.

We are aware that toothed disks are not in themselves new, the same having been shown in the patent of Chapman, of 1853, in connection with a blade designed for sawing stone, such blade being adapted for horizontal movement upon the stone. We do not, therefore, broadly claim toothed disks.

Having thus described our invention, what we claim is—

1. In a stone-channeling machine, a cutter-bar or cutter-carrier having a series of toothed cutting-wheels, in combination with mechanism, substantially as described, for imparting a reciprocating motion in delivering the blow either directly or obliquely toward and from the stone to be cut, as set forth.

2. In a stone-channeling machine, a cutter bar or carrier having a series of toothed cutting-wheels, in combination with mechanism, substantially as described, for imparting to said bar or carrier a compound motion, whereby the cutting-points are made to approach to and recede from the stone to be cut in curved lines, as set forth.

3. The combination of the cutter-bar and frame-work which carries it with oscillating cranks for supporting the same, and a shaft and crank-pin for imparting motion to said bar, whereby the cutting-points on said bar are made to oscillate through a circle or arcs of circles, substantially as described.

4. The combination of the cutter-bar and vertically-sliding bars fixed thereto with a frame having guides for said sliding bars, with a balance-wheel, drive-shaft, and wrist-pin, working in sliding box on said frame, and with suitable mechanism for feeding the cutting-bar downward, substantially as described.

5. The combination of the cutting-bar with means for imparting to said bar an oscillating or equivalent movement in curved lines approaching to and receding from the stone to be cut, and a series of toothed cutting-wheels, said wheels being set at a distance apart less than the length of the arc of movement of any cutting-point, whereby a continuous channel is cut, as set forth.

6. In a stone-channeling machine, a cutting-bar provided with toothed cutting-wheels, fixed in pairs on a shaft, in combination with an intermediate clearer, substantially as described.

7. The combination of the cutting-wheels, fixed in pairs on a shaft, and the removable bar, substantially as described.

8. The combination of the bar and the cutting-wheels, said wheels being in pairs on the same axis and having faces outside the plane of the bar, as set forth.

9. In combination with the cutting-bar of a stone-channeling machine, adapted to operate as described, the cutting-wheel set in the end of said bar, substantially as described.

In testimony whereof we have signed our names to this specification in the presence of two subscribing witnesses.

ALBERT GUILFORD WEBSTER.
CYRENIUS METCALF WILLARD.

Witnesses:
C. S. COLBURN,
JAMES D. WINSLOW.